United States Patent [19]
Coppa et al.

[11] Patent Number: 4,657,388
[45] Date of Patent: Apr. 14, 1987

[54] METHOD OF AND APPARATUS FOR MEASURING THE CUT-OFF WAVELENGTH OF THE FIRST HIGHER ORDER MODE IN OPTICAL FIBERS

[75] Inventors: Gianni Coppa, Asti; Pietro Di Vita, Turin, both of Italy

[73] Assignee: CSELT-Centro Studi e Laboratori Telecomunicazioni SpA, Turin, Italy

[21] Appl. No.: 740,968

[22] Filed: Jun. 4, 1985

[30] Foreign Application Priority Data

Jun. 5, 1984 [IT] Italy ............................ 67580 A/84

[51] Int. Cl.[4] ........................................ G01N 21/84
[52] U.S. Cl. .................................................. 356/73.1
[58] Field of Search ...................................... 356/73.1

[56] References Cited
PUBLICATIONS

"Une Technique Nouvelle pour la Mesure de la Longueur d'Onde de Coupure des Fibres Monomodes"–paper presented by G. Grosso et al, ECOC Cannes, Sep. 1982.
"Polarization Measurement of Cut–Off Wavelength in Monomode Fibers", paper presented by Coppa et al (instant inventors), at ECOC Geneva, Oct. 1983.
"New Method for Measuring V–Value of a Single–Mode Optical Fibre"–article by Y. Tatsuyama et al (Electronics Letters, Dec. 1976).

Primary Examiner—Vincent P. McGraw
Attorney, Agent, or Firm—Karl F. Ross; Herbert Dubno

[57] ABSTRACT

The cut-off wavelength of the first higher order mode in optical fibers for telecommunication is measured based on the fact that the introduction of perturbations in an optical fiber can generate greater losses on higher order modes than on the lower order modes. A spectral scanning of the fiber output power is effected under a certain number of different perturbations conditions and the values obtained are combined so as to determine the fraction of power guided in the fundamental mode. The cut-off wavelength is that where this fraction exceeds a certain value.

10 Claims, 4 Drawing Figures ary mode, precise knowledge of $V_0$ or $\lambda_0$ is of

METHOD OF AND APPARATUS FOR MEASURING THE CUT-OFF WAVELENGTH OF THE FIRST HIGHER ORDER MODE IN OPTICAL FIBERS

FIELD OF THE INVENTION

Our present invention refers to optical fibers for telecommunications and, more particularly, to a method of and an apparatus for measuring the cut-off wavelength of the first higher order mode in such fibers.

BACKGROUND OF THE INVENTION

Monomode fibers (i.e. fibers capable of propagating only one electromagnetic mode, the fundamental mode) are usually used for telecommunications, since they have low attenuation and high capacity in terms of information that can be transmitted per unit time.

Propagation characteristics and the number of modes guided in a fiber depend largely on normalized frequency V, which depends in turn on the radius a of the fiber core, the maximum numeric aperture $\Delta$ and the operation wavelength $\lambda$ according to relation:

$$V = 2\pi \cdot a \cdot \Delta / \lambda.$$

In particular a value $V_0$ exists above which (and thus a wavelength $\lambda_0$ below which) the fiber no longer acts as a monomode fiber because, under these conditions, other modes, besides the fundamental mode, can be propagated.

As the advantages stated depend for the most part on fiber monomodality, precise knowledge of $V_0$ or $\lambda_0$ is of interest.

The value of $\lambda_0$ can be obtained from $V_0$, determined in turn from the fiber refractive index profile. However the accurate determination of the refractive index profile requires sophisticated measurements and the value obtained can have only limited interest. In fact, the practical use value is an effective value which depends strictly on environmental conditions: hence, the value determined could require empirical corrections. Consequently it would be advantageous to directly measure the effective value of $\lambda_0$.

An accurate measurement of $\lambda_0$ should be based on the determination of the power fraction, guided in the fundamental mode by a fiber trunk under test, versus wavelength. The decrease in the power guided in the higher order mode can be quantitatively observed and the cut-off wavelength can be defined as the wavelength at which power fraction guided in the fundamental mode exceeds a predetermined value (e.g. 90% for a fiber trunk 2 m long) so that the power guided in the higher order mode becomes neglectable.

One method of cut-off wavelength measurement based on this principle is described in the paper "*Une technique nouvelle pour las mesure de la longueur d'onde de coupure des fibres monomodes*" presented by G. Grosso, P. Spano, G. De Marchis, at the 8th ECOC, Cannes, Sept. 21-24, 1982 and published at pages 98-101 of the Conference Proceedings.

This method determines the relative power fraction guided in the different modes through coherence measurements of the electromagnetic field at the output end of the fiber under examination. Accurate values of the cut-off wavelength are obtained, but quite sophisticated equipment is required.

A second method is described by us in the paper "*Polarization measurement of cut-off wavelength in monomode fibers*", presented at the 9th ECOC, Geneva, Oct. 23-26, 1983, and published at page 193-196 of the Conference Proceedings.

This method takes advantage of the different polarization properties of the fundamental mode with respect to the higher order modes and can be implemented with simple measuring equipment, but the physical conditions of the fiber under test must be accurately controlled. Hence the measurement is time consuming and expensive.

OBJECTS OF THE INVENTION

It is an object of the present invention to provide a method for the measurement of the cut-off wavelength of the first higher mode in optical fibers requiring neither sophisticated equipment nor prolonged controls of fiber conditions.

Another object is to provide improved means for carrying out the method.

SUMMARY OF THE INVENTION

Our invention is based on the introduction of controlled perturbations on the fiber under test, so as to cause losses which are significant only as to the first higher order mode (or higher order modes). This method allows not only cut-off wavelength to be determined, but also provides quantitative information on such losses as can be useful in fiber characterization during manufacturing.

A method for cut-off wavelength measurement requiring the introduction of a perturbation (in particular a full turn) in a fiber under test, has already been proposed.

This method, described by Y. Katsuyama, M. Takuda, N. Uchida, M. Nakahara in the article "*New method for measuring V-value of a single mode optical fiber*" does not determine the power guided by the fundamental mode, but detects the attenuation peaks, due to the perturbation, in correspondence of the cut-off wavelengths of the different modes. Because the peak is large relative to the first higher order mode, the measurement is quite undeterminate and the results are rather inaccurate. Furthermore, the results depend largely on perturbation characteristics, which are only reproducible with difficulty.

According to the invention, more particularly, the process or method of measuring the cut-off wavelength of the first higher order mode in an optical fiber comprises illuminating the fiber with radiations at different wavelengths, and determining the power fraction guided in the fundamental mode at the different wavelengths.

We carry out a spectral scanning of the output power under at least three different perturbation conditions, a first of which is the absence of perturbations, a second of which is the introduction of a first mechanical and/or geometrical alteration, and the third being a second such alteration in combination with the first one. The two alterations are selected to be of known characteristics but which do not bring about mode inversion and attenuation in the fundamental mode.

The values of the output power at the different conditions are stored for each wavelength and the power fraction is determined from a combination of these values. The cut-off wavelength is the wavelength at which the power fraction exceeds a prefixed value.

The first and second alterations can be identical or different and, if different, a further spectral scanning of the output power of the fiber is carried out in a fourth perturbation condition obtained by introducing the second alteration exclusively in the fiber.

Each alteration can be obtained by constraining the fiber in a serpentine path.

For a given wavelength, we indicate by:

$P_0$ the power guided by the fundamental mode (mode $LP_{01}$);

$P_1$ the power guided by the higher order mode (generally, mode $LP_{11}$);

The power fraction propagating in the fundamental mode is then:

$$\epsilon(\lambda) = \frac{P_0}{P_0 + P_1}$$

In order to obtain this fraction, according to the invention controlled perturbations are introduced into the fiber, so as to cause neither mode conversions nor significant losses in the fundamental mode; $\epsilon(\lambda)$—value can be obtained through different measurements of power W transmitted in the fiber under different perturbation conditions and combining the results. Measurement of the power transmitted in the absence of perturbation (first condition) gives the following value $$W = K(P_0 + P_1) \quad (1)$$

A second measurement (second condition), carried out introducing along the fiber a first perturbation A, gives the following value for the power transmitted $$W_a = K[P_0 + P_1 \exp(-\gamma_a)] \quad (2)$$

where $\gamma_a$ is the loss undergone by the higher order modes because of perturbation A.

A third measurement (third condition) carried out in the presence also of a second perturbation B along the fiber, gives value:

$$W_{ab} = K[P_0 + P_1 \exp(-\gamma_a - \gamma_b)] \quad (3)$$

where $\gamma_b$ is the loss undergone by higher order modes because of perturbation B.

Finally, another measurement carried out in the presence only of perturbation B, gives value:

$$W_b = K[P_0 + P_1 \exp(-\gamma_b)]. \quad (4)$$

Obviously, the latter measurement is unnecessary if perturbation B is identical to A, as $W_a = W_b$; as shown by the description of the apparatus and its operation, the application of two identical perturbations on the fiber is not a problem.

By simple mathematical operations, the preceding relations give:

$$\epsilon(\lambda) = \frac{P_0}{P_0 + P_1} = \frac{WW_{ab} - W_a W_b}{W(W - W_a - W_b + W_{ab})} \quad (5)$$

The cutoff wavelength is obtained when $\epsilon(\lambda)$ exceeds a predetermined value.

Furthermore, the same measurements give also loss coefficients $\gamma_a$, $\gamma_b$. In particular:

$$\gamma_a = -\log[(W_{ab} - W_a)/(W_b - W)] \quad (6)$$

$$\gamma_b = -\log[(W_{ab} - W_b)/(W_a - W)]$$

BRIEF DESCRIPTION OF THE DRAWING

The above and other features and advantages will become more readily apparent from the following, reference being made to the accompanying drawing in which.

SPECIFIC DESCRIPTION

Figure 1:
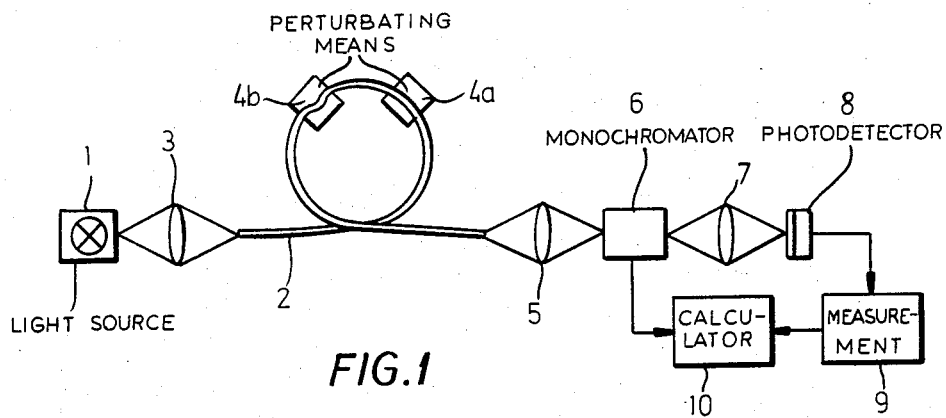
FIG. 1 is a schematic representation of apparatus for carrying out the method according to the invention.

As can be seen from FIG. 1, a source of light, comprising radiations at the wavelengths usually used for optical fiber transmission, illuminates an end of a fiber trunk 2 and is focused on said end through a suitable optical system 3. Fiber 2 in its path passes within a pair of devices 4a, 4b comprising perturbating means which allow the fiber to undergo controlled perturbations or to be left unperturbed.

The light outgoing from the fiber is focused, through a second optical systems, 5, on a monochromator 6 comprising a dividing means which allows monochromatic radiations at different wavelengths to be isolated from the light. Obviously, monochromator 6 could also be placed upstream of fiber 2 under test. Monochromatic radiations outgoing from monochromator 6 are focused, through a third optical system 7, on a photodetector 8 comprising photodetection means, connected to measuring means 9 for determining the power of the electrical signal outgoing from the photodetector, followed on their turn by a calculating means or computer 10 for measuring both power fraction $\epsilon(\lambda)$ guided in the fundamental mode at different wavelengths, according to relations (5), and the losses at higher modes, according to relation (6). If necessary, $\epsilon(\lambda)$ behavior can also be displayed.

Figure 2:
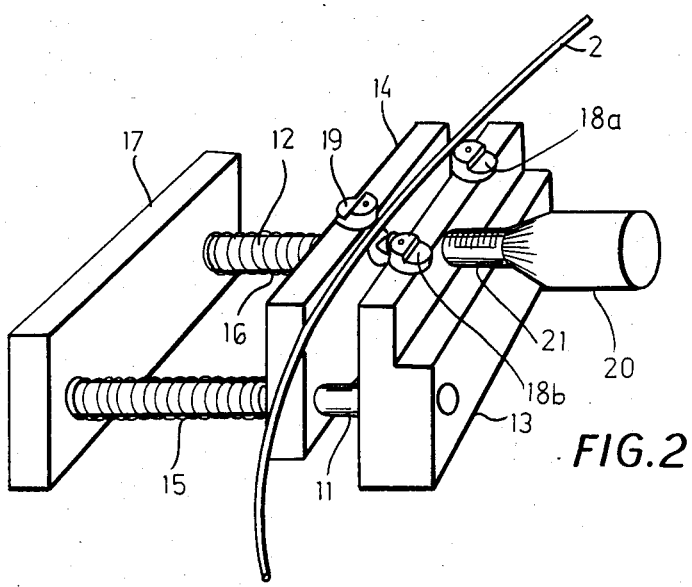
FIG. 2 is a possible example of the means which introduce a controlled perturbation on the fiber.

A very simple way to obtain the perturbation of fiber 2 under examination can consist in causing the fiber to follow a serpentine path with very small bending radius. In this case, devices 4a, 4b can have the structure shown in FIG. 2. The perturbation must not promote inversion and attenuation in the fundamental mode.

Two plates 13, 14 are mounted on a couple of horizontal guides 11, 12. The first plate is fixed, while the second plate can be moved along guides 11, 12 against the action of springs 15, 16 of which can end presses against the plate, while the other abuts against a second fixed element 17 rigid with the guides. The two plates carry two roller groups (e.g. two rollers 18a, 18b on fixed plate 13 and a roller 19 on mobile plate 14) with parallel axes, and the fiber is made to pass between said rollers. The rollers 18a and 18b can have a diameter of 1 cm or less and the distance between the axes may be 2 cm or less. Mobile plate 14 can be displaced by micromanipulator 20 mounted on fixed plate 13 and having a graduated scale 21 allowing displacement control. For the sake of simplicity, the means retaining fiber 2 between the rollers are not shown.

Using the device described, the process according to the invention is implemented as follows: the fiber is placed between the rollers of devices 4a, 4b which first are left at such a distance that no perturbation is introduced in fiber 2; the light of source 1 is transmitted through fiber 2, outgoing power W at different wavelengths is measured and the values obtained are stored in calculator 10.

Then, through device 4a the first perturbation is introduced in fiber 2 moving supports 13, 14 of rollers 18a, 18b, 19 toward one another with micromanipulator 20, so that the fiber makes a serpentine path between the rollers, and the values of Wa at different wavelengths are measured and stored. The measurement is repeated with introduction of the second perturbation through device 4b so that values $W_{ab}$ are obtained.

Micromanipulator 20 with a graduated scale 21 makes it easy to ensure that the supports of rollers of devices 4b and 4a are at the very same distance. In that case, the second perturbation will be identical to the first and a fourth measurement in the presence of the only second perturbation is no longer necessary.

Now, the values of W, $W_a$ ($=W_b$), $W_{ab}$ at different wavelengths are stored in calculator 10 which can obtain, according to relation (5), the value of $\epsilon(\lambda)$, detect the wavelength where $\epsilon(\lambda)$, reaches the predetermined value and supply, according to relations (6), the values of loss $\gamma_a$ ($=\gamma_b$) of higher order mode.

The previous description shows that the measurement of $\epsilon_0$ requires neither sophisticated equipment nor long control operations. In fact, all equipment components are commonly used in optical measurement or implemented with easily available parts. Furthermore, the only manual operation (which can be automated) is the adjustment of the position of rollers 18, 19 in order to introduce the different perturbations, this being a rapid operation. All other operations are automatically carried out by calculator/computer 10 in accordance with the operating algorithm previously given.

Figure 3:
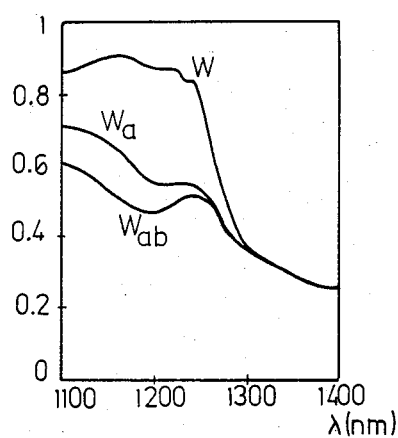
FIGS. 3 and 4 are graphs illustrating the results of a measurements taken according to the invention.
Figure 4:
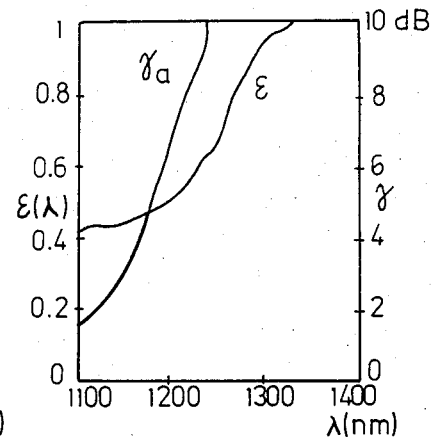

FIGS. 3 and 4 show W, $W_a$, $W_{ab}$ and $\gamma(\lambda)$ versus wavelength (in nanometers), for a fiber whose cut-off wavelength (defined as above) is 1280 mm.

In FIG. 3 the ordinates are in arbitrary units and in FIG. 4 the left ordinate refers to values of $\epsilon$ and the right ordinate to attenuation $\lambda$, expressed in dB.

The graphs are self-explanatory and require no further detailed description.

Even though the description refers to a perturbation obtained by constraining the fiber in a serpentine path, the fiber can undergo any other perturbation which changes in a controllable and repeatable way its mechanical and/or geometrical characteristics (for example, a compression).

We claim:

1. A method of measuring cutoff wavelengths of the first higher order mode in optical fibers comprising:
   illuminating optical fibers at a plurality of different wavelengths;
   perturbating said fiber under at least three conditions said conditions comprising absence of perturbation, first mechanical alteration, and second mechanical alteration added to said first mechanical alteration, wherein said first alteration and said second alteration are of known characteristics and do not promote inversion and attenuation in fundamental mode;
   converting output of said fiber at said wavelengths into electrical signals in a spectral scanning of said output;
   measuring power from said electrical signals;
   calculating a power fraction guided in said fundamental mode as a combination of the power measured for each of said conditions; and
   calculating said cutoff wavelength at a wavelength where said power fraction exceeds a predetermined value.

2. The method defined in claim 1 wherein said first and said second alterations are substantially identical.

3. The method defined in claim 1 wherein said first and said second alterations are different and said spectral scanning further comprises a fourth perturbation condition wherein said fourth perturbation condition comprises said second alteration exclusively.

4. The method defined in claim 1 wherein each of said alterations is obtained by constraining said fiber in a serpentine path.

5. The method defined in claim 2 wherein each of said alterations is obtained by constraining said fiber in a serpentine path.

6. The method defined in claim 3 wherein each of said alterations is obtained by constraining said fiber in a serpentine path.

7. A device for measuring cutoff wavelength of the first higher order mode in an optical fiber comprising:
   a light source radiating at a plurality of wavelengths;
   means for coupling an optical fiber input to said light source;
   spectral analyzing means coupled to an output of the optical fiber for dividing said output into different wavelengths;
   photodetection means coupled to said spectral analyzing means for transforming the output of said optical fiber into electrical signals;
   means for applying at least three perturbation conditions to said fiber said conditions comprising absence of perturbation, first mechanical alteration, and said first mechanical alteration in combination with second mechanical alteration, wherein said first alteration and said second alteration are of known characteristics and do not promote inversion and attenuation in fundamental mode;
   measuring means connected to said photodetection means for measuring power from said electrical signals; and
   calculating means coupled to said measuring means and said spectral analyzing means for measuring said power at said different wavelengths for calculating a power fraction guided in said fundamental mode from a combination of values of power measured by said measuring means for each wavelength under said conditions, said means for applying said perturbation conditions including first perturbating means coupled to said fiber and second perturbating means coupled to said fiber wherein said first perturbating means and said second perturbating means are separately operable for introducing controlled and reproducible perturbations in said fiber.

8. The device defined in claim 7 wherein said first and said second perturbating means are constructed and arranged to introduce equal perturbations in said fiber.

9. The device defined in claim 7 wherein said first perturbating means and said second perturbating means introduce bends with very small radii into said fiber.

10. A device defined in claim 7 wherein said first perturbating means and said second perturbating means each comprise two groups of facing rollers which define a guide within which said fiber passes, one of said groups being placed on mobile support associated with means which vary a distance between said two groups of rollers wherein said mobile support indicates a distance value.

* * * * *